(No Model.) 4 Sheets—Sheet 1.

O. SCHLEICHER.
STEERING GEAR FOR VESSELS.

No. 528,183. Patented Oct. 30, 1894.

Witnesses:
H. J. Dieterich
M. J. L. Higgins

Inventor:
Otto Schleicher
By Henry Orth
Atty.

(No Model.) 4 Sheets—Sheet 2.

O. SCHLEICHER.
STEERING GEAR FOR VESSELS.

No. 528,183. Patented Oct. 30, 1894.

Witnesses:
H. G. Dieterich
M. G. L. Higgins

Inventor:
Otto Schleicher
By Henry Orth
Atty.

Figure 5:
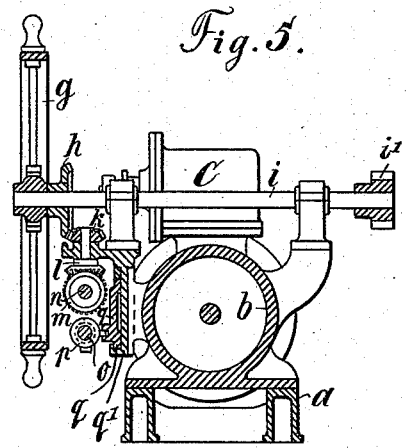

(No Model.) 4 Sheets—Sheet 3.
O. SCHLEICHER.
STEERING GEAR FOR VESSELS.
No. 528,183. Patented Oct. 30, 1894.
Fig. 5.
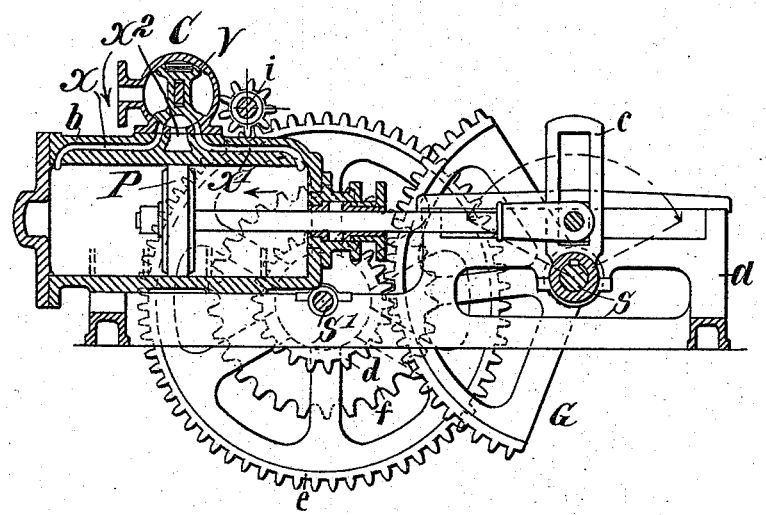
Fig. 6.  Fig. 7.  Fig. 8.
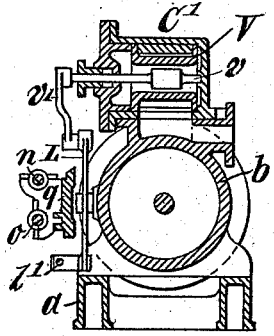 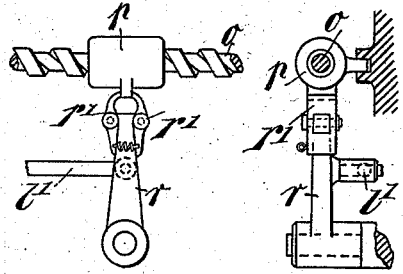
Witnesses:
H. G. Dieterich
M. G. L. Higgins
Inventor:
Otto Schleicher
By Henry Orth
Atty (No Model.) 4 Sheets—Sheet 4.

O. SCHLEICHER.
STEERING GEAR FOR VESSELS.

No. 528,183. Patented Oct. 30, 1894.

Witnesses
H. G. Dieterich
Henry Ort

Inventor
Otto Schleicher
by Henry Ort
atty

UNITED STATES PATENT OFFICE.

OTTO SCHLEICHER, OF MAGDEBURG, GERMANY.

STEERING-GEAR FOR VESSELS.

SPECIFICATION forming part of Letters Patent No. 528,183, dated October 30, 1894.

Application filed March 2, 1893. Serial No. 464,338. (No model.) Patented in Germany June 10, 1891, No. 64,225.

*To all whom it may concern:*

Be it known that I, OTTO SCHLEICHER, a subject of the German Emperor, residing at 14 Pfälzerstrasse, Magdeburg, Germany, have invented certain new and useful Improvements in or Relating to Steering-Gear for Vessels, (for which I have obtained a patent in Germany, dated June 10, 1891, No. 64,225;) and I do hereby declare the following to be a full, clear, and exact description of the invention.

My invention has relation to steering gear for vessels, and it has for its object the provision of means for operating the rudder by hydraulic power, and consists essentially in structural features, and in combinations of co-operative mechanisms whereby the desired results are obtained, as will now be fully described, reference being had to the accompanying drawings, in which—

Figure 1:
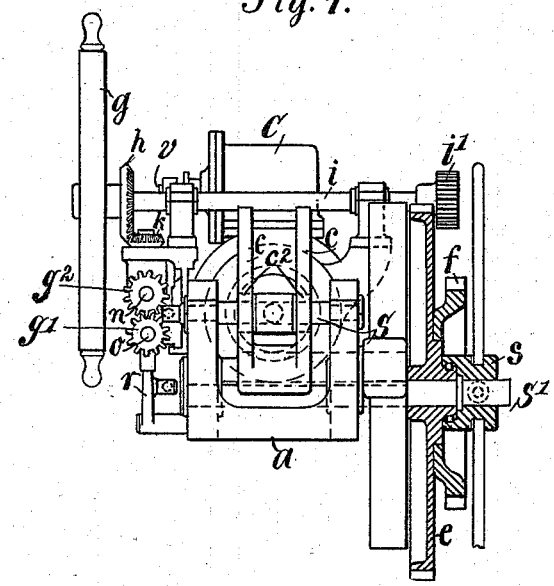
Figure 2:
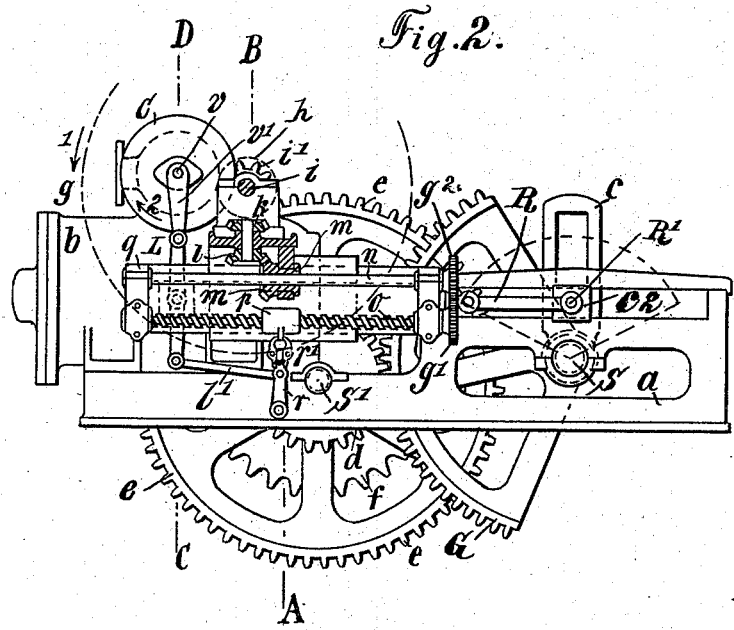
Figure 9:
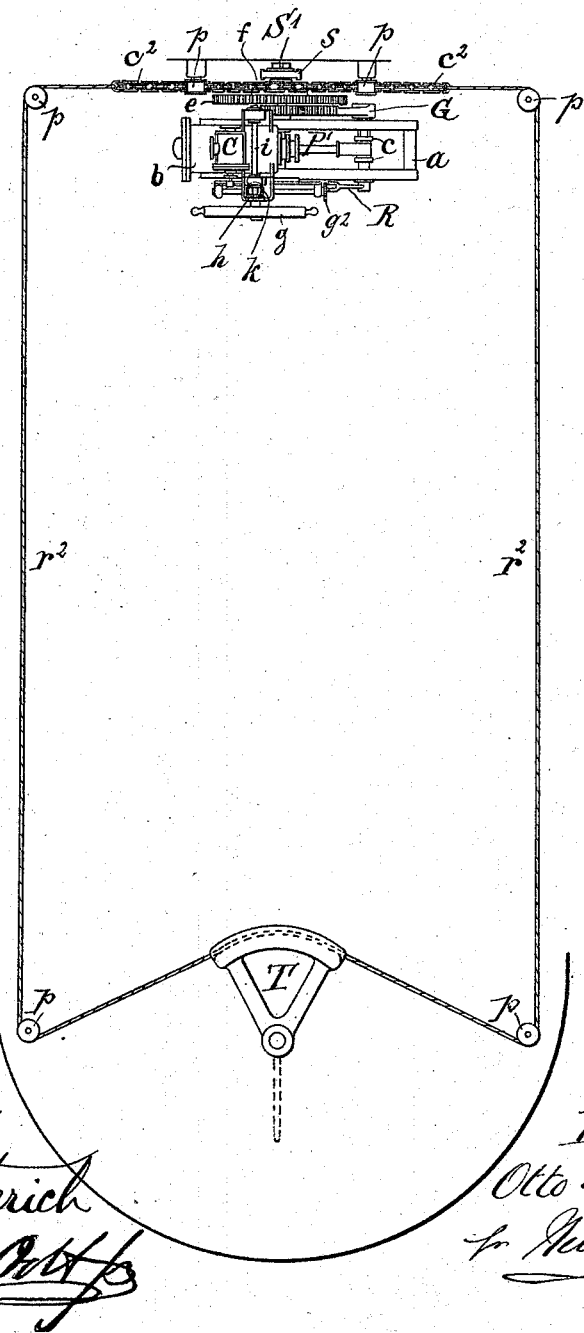

Figure 1 is a left hand elevation partly in section; Fig. 2, a side elevation partly in section; Fig. 3, a longitudinal central sectional view, and Fig. 4 a top plan view, of a hydraulic steering apparatus embodying my invention. Figs. 5 and 6 are sections taken respectively on or about on lines A—B and C—D, of Fig. 2. Figs. 7 and 8 are a front and a sectional side elevation of the devices that control the distributing valve; and Fig. 9 is a top plan view of the apparatus illustrating the connections with the tiller, the shaft $i$ on the side of the sprocket wheel $f$ being broken away to more clearly show the transmitting chain.

Figure 4:
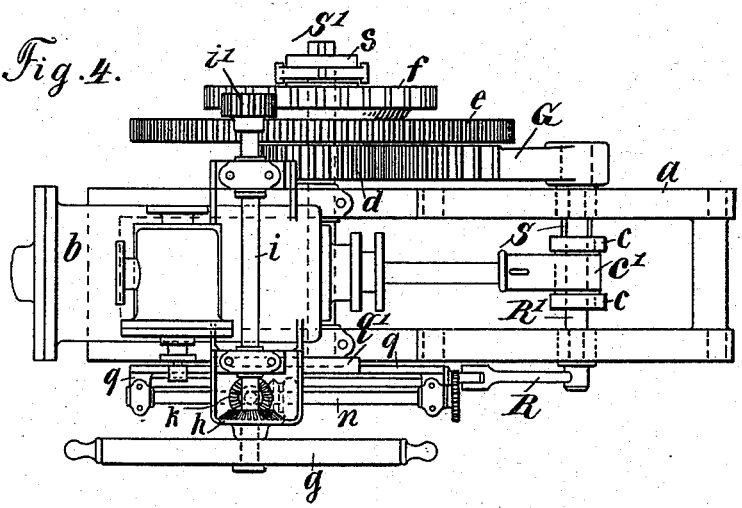

In the above drawings, $a$ indicates the frame that serves as a support for the hydraulic steering apparatus, $b$ the cylinder of the hydraulic engine or motor, P its piston, and P' the piston rod whose outer end is connected to a suitable cross head $c'$ fitted in slides $c$ keyed to and projecting radially from a shaft S. The latter shaft carries a segment gear G that meshes with a gear wheel $d$, fast on a shaft S' that carries a gear wheel $e$ and a sprocket wheel $f$. The wheels $e$ and $f$ are rigidly connected together and mounted loosely on shaft S' but normally coupled thereto by means of a clutch coupling $s$ of well known construction, as shown in Figs. 1 and 4.

C indicates the valve chest in which is arranged a valve V, Figs. 3 and 6, whose stem $v$ is connected by a link $v'$ to an actuating lever L, Figs. 2 and 6, that has its fulcrum on the engine cylinder $b$, said lever being connected by a rod $l'$ with a rock lever $r$ fulcrumed to the frame $a$. The rock lever $r$ has pivoted to its upper end a pair of spring-actuated clamping jaws, $r'$, Figs. 2, 7, and 8, said jaws having motion against the stress of their springs toward each other only, and are adapted to engage a lug projecting radially from an actuating sleeve $p$, screw-threaded interiorly and mounted on a correspondingly threaded spindle $o$, which has its bearings in a carriage or slide $q$ that slides in suitable ways $q'$ on the frame $a$. The sleeve $p$ therefore serves to rock the lever $r$ in one or the other direction according to the direction of motion of the sleeve on, or with its screw spindle. The carriage $q$ is connected by a link R to a short shaft R' on which the cross head $c'$ and the slide blocks $c^2$ are mounted, said slide blocks $c^2$ sliding in suitable ways in the frame $a$ as shown in Fig. 2, and in dotted lines in Fig. 4.

By means of the described arrangement the carriage $q$ is caused to move synchronously with the piston P, the lug on the actuating sleeve $p$ entraining the rock lever $r$, whereby the distributing valve V is returned to its normal position, and the supply of fluid to the cylinder $b$ cut off whenever said valve is displaced through the medium of the steering wheel, as hereinafter explained.

The distributing valve V is set to admit motive fluid to one or the other side of the piston P, through port or passage $x$ or $x'$ by means of the following instrumentalities:

A shaft $n$, revoluble in bearings in the carriage $q$ has at one end a gear wheel $g^2$, that meshes with a like wheel $g'$ on screw spindle $o$. The shaft $n$ extends through a bevel wheel $m$, that is adapted to revolve in a suitable bearing on the frame $a$, said bevel wheel $m$ being connected with shaft $n$ by a groove and feather, for instance, to revolve said shaft without interfering with its motion with the carriage $q$. The bevel wheel $m$ meshes with a like wheel $l$ secured to a short vertical spindle that carries at its other end a bevel wheel $k$ in gear with a like wheel $h$ on the steering spindle $i$, said spindle carrying also the steering wheel $g$ at one end, and a pinion $i'$ at its opposite end, as shown in Figs. 1, 4 and 5. The steering spindle $i$ is adjustable endwise in its bearings, so that the pinion $i'$ may be brought into gear with the toothed wheel $e$, Figs. 1, 3 and 4. The sprocket wheel $f$ may be connected by a Galle or similar chain, either directly with the tiller ropes, or the oscillations of the wheel may be transmitted to the rudder by an intermediate shaft. In Fig. 9 I have shown the former arrangement, the Galle chain $c^2$ being actuated by sprocket wheel $f$, Figs. 1 and 4, and having its ends attached to the tiller ropes $r^2$ connected with the tiller T and guided by suitable pulleys $p$.

Normally the pinion $i'$ is out of gear with the wheel $e$, but in case of an accident to the engine or mechanism operated thereby, or to the valve mechanism, or in case of failure of operation of the engine from any cause, the steering spindle $i$ can be adjusted in its bearings so as to bring the pinion $i'$ in gear with the wheel $e$, whereby the rudder can be positioned directly through said elements after the wheel $e$ and the power transmitting sprocket wheel $f$ have been uncoupled from shaft S' by disengaging the clutch $s$. By this endwise adjustment of the spindle $i$, the bevel wheel $h$ is moved out of gear with the like wheel $k$ to throw the valve gear out of operation.

The operation of the described steering gear is as follows: Figs. 2 and 3 show the operating devices in their normal position. If the steering wheel $g$ is revolved in the direction of arrow 1, Fig. 2, the sleeve $p$ through the gearing $h$, $k$, $l$, $m$, $g^2$, $g'$, will receive motion in a reverse direction or toward the left, which motion is communicated to the valve V through levers $r$ and L, and the radial arm $v'$ on the valve spindle $v$ in the same direction, as indicated by arrow 2 in said Fig. 2, whereby motive fluid is admitted to the cylinder $b$ on the right hand side of piston P through port $x'$, causing said piston to move toward the left, the sprocket wheel $f$ being caused to move toward the right under the action of the segment gear G and the gear, $d$ which is fast on shaft S'. Inasmuch as the carriage $q$ partakes of the motion of the piston, the sleeve $p$ will also move toward the left with said piston, whereby the lever L and valve V are returned to their normal or middle position, Fig. 2, and the supply of the motive fluid to the cylinder is cut off, said piston being held in its position by the pressure of such motive fluid on the right thereof. If now, the valve V through the medium of the gearing described, is positioned to admit motive fluid to the left of the piston P through the port $x$, which is done by a displacement of the actuating sleeve toward the left, the exhaust port $x^2$ will be uncovered and the fluid on the right of the piston exhausted from the cylinder, said piston moving toward the right and carrying with it the sleeve and lever $r$ to their normal position to again cut off the supply of motive fluid to the cylinder and hold the piston in its new position, said motion of the piston being communicated to the tiller through the mechanism described.

The amplitude of the movements of the steering wheel $g$ in one or the other direction need not exceed that required for unseating the valve V, so that the lug on sleeve $p$ need not necessarily move from between the jaws $r'$ on lever $r$. Yet, should this occur, from any cause, as for instance by a too rapid rotation of the steering wheel, said lug will be automatically returned to its normal position between the said jaws $r'$, in view of the fact that the piston after the sleeve $p$ has been moved in one direction through the medium of the steering wheel, moves said sleeve in an opposite direction, and its lug encountering one of the lever jaws rides over the same and engages the other jaw, carrying the lever $r$ along to its normal position. This can take place, since, as hereinbefore stated, said jaws have motion against the stress of their springs toward each other.

It will be readily understood that the reciprocating motion of the piston P may be converted into rotary motion, and said motion transmitted to the gear $d$ by any suitable converting mechanism, as by means of rack bars and intermediate gearing, or by means of wire ropes or chains arranged to revolve a drum, and that instead of a revoluble or cylindrical valve V, a slide valve may be employed.

In practice the steering spindle $i$ is connected with an axiometer, so that the helmsman may at all times be informed of the position of the tiller and rudder.

Having thus described my invention, what I claim as new therein, and desire to secure by Letters Patent, is—

1. In a steering gear for vessels, the combination with a power transmitting device as the sprocket wheel $f$ and the steering wheel, of an engine, transmitting mechanism connecting the piston of said engine with the power transmitting wheel, a distributing valve, a shaft adapted to receive rotary motion from the steering wheel and endwise motion from the piston, and intermediate mechanism controlled respectively by the revolution and endwise movement of the shaft to unseat and seat said valve, for the purpose set forth.

2. In a steering gear for vessels, the combination with a power transmitting device, as the sprocket wheel $f$ and the steering wheel, of an engine, transmitting mechanism connecting the piston of said engine with the power transmitting device, a shaft adapted to receive rotary and endwise motion from the steering wheel and piston respectively, an actuating device adapted to move with as well as lengthwise of said shaft, and intermediate mechanism operated by the actuating device and adapted to unseat the valve when moved lengthwise of its shaft and to seat said valve when moving with the shaft, for the purpose set forth.

3. In a steering gear for vessels, the combination with a power transmitting device, as the sprocket wheel $f$ and the steering wheel, of an engine, transmitting mechanism connecting the piston of said engine with the sprocket wheel, a distributing valve, a screw shaft having endwise motion with the piston, gearing connecting the screw shaft with the steering wheel adapted to impart rotary motion to said shaft, an actuating sleeve on the latter, a lever in engagement with the sleeve, and intermediate mechanism connecting the lever with the distributing valve, whereby when said screw shaft is revolved in one or the other direction said lever will be moved in a corresponding direction and the movement thereof transmitted to the valve, for the purpose set forth.

4. In a steering gear for vessels, the combination with a power transmitting device, as a sprocket wheel $f$ and the steering wheel, of an engine, transmitting mechanism connecting the piston of said engine with the sprocket wheel, a distributing valve, a screw shaft having endwise motion with the piston, gearing connecting the screw shaft with the steering wheel adapted to impart rotary motion to said shaft, an actuating sleeve having motion on and with said screw shaft, a lever in engagement with the sleeve, and intermediate mechanism connecting the lever with the distributing valve whereby said valve is automatically unseated when the sleeve is moved along the shaft and returned to a normal position when said sleeve moves with its said shaft for the purpose set forth.

5. In a steering gear for vessels, the combination with a power transmitting device, as the sprocket wheel $f$, and the steering wheel, of an engine, transmitting mechanism connecting the piston of said engine with the sprocket wheel, a distributing valve adapted to be operated by the steering wheel, mechanism controlled by the piston and adapted to return the valve to a normal position whenever displaced by the steering wheel, mechanism for disconnecting the steering wheel from the valve operating devices, and appliances controlled by said steering wheel and adapted to operate the sprocket wheel independently of the piston, for the purpose set forth.

6. In a steering gear for vessels, the combination with a power transmitting device, as a sprocket wheel $f$, an engine, a segment gear, as G, means connected with the rod of the piston for said engine adapted to impart an oscillating motion to said gear, the transmitting gear $d$ adapted to impart motion to sprocket wheel $f$, a distributing valve, a screw spindle $o$ having motion with the aforesaid piston, and the sleeve $p$ provided with a radial lug and having motion with and on said screw spindle, of gearing connecting the latter with the steering wheel, lever $r$ provided with spring actuated jaws $r'$ normally in engagement with the lug on the aforesaid sleeve, and intermediate connections between the stem of said valve and lever $r$, substantially as and for the purpose set forth.

7. In a steering gear for vessels, the combination with the shaft S' the connected wheels $e$ and $f$ loose thereon, and a coupling for coupling the same to said shaft, of the steering spindle $i$ and the wheel $h$ and pinion $i'$ thereon, said spindle adapted to revolve and move endwise in its bearings, for the purpose set forth.

In testimony whereof I have hereunto affixed my signature in the presence of two witnesses.

OTTO SCHLEICHER.

Witnesses:
R. MEINERT,
D. REICK.